(12) United States Patent
Hidaka et al.

(10) Patent No.: US 9,414,464 B2
(45) Date of Patent: Aug. 9, 2016

(54) LIGHTING SYSTEM

(71) Applicant: Panasonic Corporation, Osaka (JP)

(72) Inventors: Yuto Hidaka, Osaka (JP); Atsuo Nanahara, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 513 days.

(21) Appl. No.: 13/933,204

(22) Filed: Jul. 2, 2013

(65) Prior Publication Data

US 2014/0012400 A1    Jan. 9, 2014

(30) Foreign Application Priority Data

Jul. 9, 2012 (JP) ................................. 2012-153723

(51) Int. Cl.
*G05B 13/04* (2006.01)
*H05B 37/02* (2006.01)
(Continued)

(52) U.S. Cl.
CPC ............ *H05B 37/02* (2013.01); *F21V 23/0478* (2013.01); *H05B 37/0227* (2013.01); *H05B 37/0281* (2013.01); *Y02B 20/42* (2013.01)

(58) Field of Classification Search
CPC ............. A61B 5/04017; A61B 5/7203; A61B 5/04288; A61B 5/7217; H05B 37/02; H05B 37/0281; H05B 37/0227; F21V 23/0478; Y02B 20/42
USPC ................................................. 700/28; 702/4
See application file for complete search history.

(56) References Cited

U.S. PATENT DOCUMENTS 3,898,643 A * 8/1975 Ettlinger ............... H05B 37/029
307/157
5,962,989 A * 10/1999 Baker ..................... H05B 37/02
315/294

(Continued)

FOREIGN PATENT DOCUMENTS

JP    H09-289082 A    11/1997
JP    2002-134282 A    5/2002

(Continued)

OTHER PUBLICATIONS

Mistrick-R., "Performance Modeling of Daylight Integrated Photosensor-Controlled Lighting Systems", 2011, Winter Simulation Conference, IEEE, pp. 903-914.*

(Continued)

*Primary Examiner* — Robert Fennema
*Assistant Examiner* — Thomas Stevens
(74) *Attorney, Agent, or Firm* — Renner, Otto, Boisselle & Sklar, LLP.

(57) ABSTRACT

The lighting system in accordance with the present invention includes a lighting fixture including a first controller configured to control a light source; and a sensing device. The sensing device includes: an image sensor configured to take an image of a predetermined area; and a second controller having a function of adjusting sensitivity of the image sensor and a function of setting a dimming rate for the light source. The first controller is configured to light the light source at a dimming level according to the dimming rate set by the second controller. The second controller is configured to, when concluding that a condition where no person is present in the predetermined area continues for a predetermined time period, perform an operation of decreasing the dimming rate by a preset value and increasing the sensitivity of the image sensor for a preset time period.

8 Claims, 3 Drawing Sheets

(51) Int. Cl.
*F21V 23/04* (2006.01)
*G01W 1/00* (2006.01)

(56) References Cited

U.S. PATENT DOCUMENTS

| | | | | |
|---|---|---|---|---|
| 6,069,926 | A * | 5/2000 | Sekiya | G06F 13/4256 358/443 |
| 7,734,356 | B2 * | 6/2010 | Cleland | H05B 37/0281 315/311 |
| 7,774,073 | B2 * | 8/2010 | Cane | G05B 19/0421 700/3 |
| 7,948,189 | B2 * | 5/2011 | Ahmed | H05B 37/0218 315/291 |
| 8,055,386 | B2 * | 11/2011 | McCoy | H04L 12/281 370/254 |
| 8,265,776 | B2 * | 9/2012 | Osann, Jr. | G06Q 50/06 340/637 |
| 8,884,203 | B2 * | 11/2014 | Verfuerth | H05B 7/0272 250/205 |
| 2002/0138156 | A1 * | 9/2002 | Wong | G06F 9/4405 700/8 |
| 2003/0040815 | A1 * | 2/2003 | Pavlidis | G06F 3/005 700/48 |
| 2004/0207342 | A1 * | 10/2004 | Novikov | H05B 39/086 315/312 |
| 2005/0090907 | A1 * | 4/2005 | Hudson | G05B 19/0421 700/3 |
| 2005/0132408 | A1 * | 6/2005 | Dahley | H04N 7/142 725/80 |
| 2006/0173560 | A1 * | 8/2006 | Widrow | G06F 17/30247 700/48 |
| 2007/0208460 | A1 * | 9/2007 | Pienta | G05D 23/1905 700/276 |
| 2008/0079568 | A1 * | 4/2008 | Primous | H05B 37/0218 340/541 |
| 2008/0265799 | A1 * | 10/2008 | Sibert | H05B 37/0245 315/292 |
| 2009/0160354 | A1 * | 6/2009 | Burrell | H05B 37/0263 315/291 |
| 2011/0270446 | A1 * | 11/2011 | Scharf | F24F 11/0001 700/282 |
| 2011/0276193 | A1 * | 11/2011 | Bowman | H05B 37/029 700/295 |
| 2011/0320013 | A1 * | 12/2011 | Chen | F24F 11/0034 700/12 |
| 2012/0206050 | A1 * | 8/2012 | Spero | B60Q 1/04 315/152 |
| 2012/0212138 | A1 * | 8/2012 | Jungwirth | H05B 33/0824 315/122 |
| 2013/0030589 | A1 * | 1/2013 | Pessina | H05B 37/0272 700/295 |
| 2013/0079911 | A1 * | 3/2013 | Dong | G06T 13/40 700/94 |
| 2013/0321637 | A1 * | 12/2013 | Frank | H04N 5/33 348/152 |
| 2014/0006506 | A1 * | 1/2014 | Frei | H04L 29/1249 709/204 |
| 2014/0217903 | A1 * | 8/2014 | Platner | H05B 37/0245 315/152 |

FOREIGN PATENT DOCUMENTS

| | | |
|---|---|---|
| JP | 2002-208493 A | 7/2002 |
| JP | 2006-270865 A | 10/2006 |
| JP | 2009-238400 A | 10/2009 |
| JP | 2009-238548 A | 10/2009 |
| JP | 2009-289472 A | 12/2009 |

OTHER PUBLICATIONS

Extended European Search Report for corresponding European Application No. 13003280.8 dated Nov. 20, 2013, 9 pages.

* cited by examiner

LIGHTING SYSTEM

TECHNICAL FIELD

The present invention relates to lighting systems.

BACKGROUND ART

In the past, there has been proposed an image monitoring device which controls an air conditioner and a lighting according to the number of persons who pass a pathway (e.g., see document 1 [JP 2006-270865 A]). This image monitoring device includes multiple (plural) wide angle cameras, a controller, and a monitor. The wide angle cameras are located on respective particular regions in the pathway. The controller determines the number of persons for each region in the pathway by use of images sent from the wide angle cameras, and controls the air conditioner and an output of the lighting according to an average of these numbers. With using this image monitoring device, it is possible to control an environment (e.g., an air conditioning environment and a lighting environment) in accordance with the number of persons in the pathway.

Further, there has been proposed a lighting system employing an image sensor. FIG. 6 shows a schematic diagram illustrating an example of this lighting system. This lighting system includes an image sensor 10 configured to take an image of a predetermined area and plural lighting fixtures 20 configured to control light outputs according to a detection result from the image sensor 10 respectively. The image sensor 10 and each lighting fixture 20 are connected through the transmission line L2.

The image sensor 10 detects reflected light derived from light emitted from the lighting fixture 20 by use of light sensing devices arranged in a two-dimensional manner, and creates a two-dimensional image by means of converting the intensity of detected light into a brightness data. In this prior art, the image sensor 10 creates plural temporally sequential images, and a variance of the brightness value of each pixel in the images from past to present to create a background image, for example.

Further, the image sensor 10 determines a difference between the brightness values of the created background image and a present image, and creates a background difference image constituted by such differences which are not less than a predetermined threshold.

Furthermore, the image sensor 10 calculates a difference between the brightness values of a present image and a previous image one frame ago, and creates an interframe difference image constituted by such differences which are not less than a predetermined threshold.

The image sensor 10 detects a person based on the differences present in the aforementioned background difference image or the interframe difference image, and selects a region in which a person is detected, as a detection region, and lights, at a dimming level, the lighting fixture 20 which is located in a vicinity of the detection region.

Note that, an area indicated by broken lines "a1" in FIG. 6 represents a sensing area of the image sensor 10, and an area indicated by solid lines "a2" represents a lighting area of each lighting fixture 20.

In the aforementioned lighting system shown in FIG. 6, to detect a person, the background difference image and/or the interframe difference image is used. However, when a person in the imaging area keeps its posture (e.g., a standing posture and a sitting posture), the background image including such a person is created. In this case, such a person may not be detected on the background difference image and/or the interframe difference image.

In view of the above, to detect a slight movement in such a situation, there has been proposed a method of increasing detection sensitivity by decreasing the threshold for determining the difference. However, when the threshold is decreased, a change in the light output of the lighting fixture 20 is likely to be determined as the difference.

Further, the image sensor 10 designed to detect reflected light has relatively low detection performance while the dimming rate for the lighting fixture 20 is relatively low. For example, when the dimming rate for the lighting fixture 20 is decreased down to a lower limit due to misrecognition that a person is not present, detection of a person becomes difficult as well as visibility for a person is decreased, and this may cause a loss in comfort.

SUMMARY OF INVENTION

In view of the above insufficiency, the present invention has aimed to propose a lighting system with improved detection accuracy based on an image sensor.

The lighting system of the first aspect in accordance with the present invention includes a lighting fixture including a first controller configured to control a light source; and a sensing device. The sensing device includes: an image sensor configured to take an image of a predetermined area; and a second controller having a function of adjusting sensitivity of the image sensor and a function of setting a dimming rate for the light source. The first controller is configured to light the light source at a dimming level according to the dimming rate set by the second controller. The second controller is configured to judge whether or not a person is present in the predetermined area, based on the image of the predetermined area taken by the image sensor. The second controller is configured to, when concluding that a condition where no person is present in the predetermined area continues for a predetermined time period, perform an operation of decreasing the dimming rate by a preset value and increasing the sensitivity of the image sensor for a preset time period.

With regard to the lighting system of the second aspect in accordance with the present invention, in the first aspect, the second controller is configured to, when acknowledging that the first controller lights the light source at the dimming level according to the dimming rate set by the second controller after the dimming rate is decreased by the preset value, increase the sensitivity of the image sensor.

With regard to the lighting system of the third aspect in accordance with the present invention, in the first or second aspect, the second controller is configured to repeat the operation until the dimming rate is equal to a lower limit.

With regard to the lighting system of the fourth aspect in accordance with the present invention, in any one of the first to third aspects, the second controller is configured to, in the operation, increase the sensitivity of the image sensor for the preset time period with regard to a region in the predetermined area in which the second controller has concluded that the condition where no person is present continues for the predetermined time period.

With regard to the lighting system of the fifth aspect in accordance with the present invention, in any one of the first to fourth aspects, the second controller is configured to, when concluding that a person is present in the predetermined area, set the dimming rate to an upper limit.

With regard to the lighting system of the sixth aspect in accordance with the present invention, in the fifth aspect, the second controller is configured to, when concluding that a person is present in the predetermined area, return the sensitivity of the image sensor to an initial level.

With regard to the lighting system of the seventh aspect in accordance with the present invention, in any one of the first to sixth aspects, the second controller is configured to, each time concluding that a person is present in the predetermined area, increase the dimming rate by a preset value and increase the sensitivity of the image sensor for a preset time period.

With regard to the lighting system of the eighth aspect in accordance with the present invention, in the seventh aspect, the second controller is configured to, when concluding that the dimming rate is equal to an upper limit, return the sensitivity of the image sensor to an initial level.

With regard to the lighting system of the ninth aspect in accordance with the present invention, in any one of the first to eighth aspects, the second controller is configured to judge whether a person is present in the predetermined area, based on whether a difference between a brightness value of the image of the predetermined area taken by the image sensor and a brightness value of a reference image is not less than a predetermined threshold. The sensitivity of the image sensor is determined by the predetermined threshold.

DESCRIPTION OF EMBODIMENTS

Figure 1:
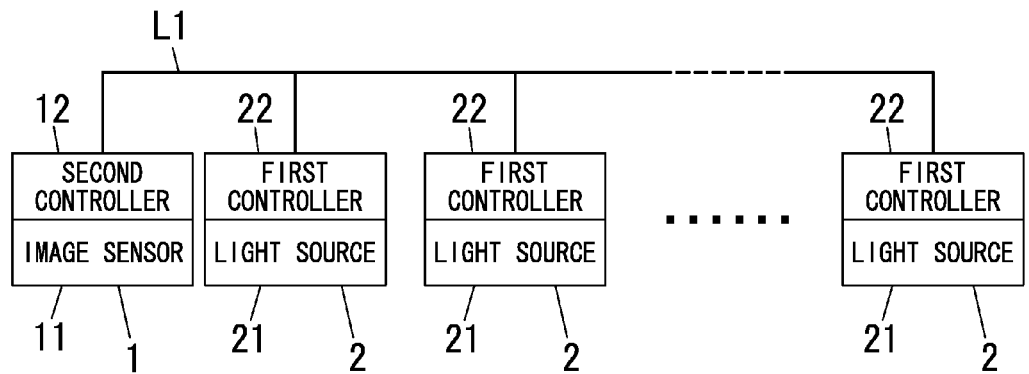
FIG. 1 is a schematic diagram illustrating an example of the lighting system of one embodiment in accordance with the present invention.

As shown in FIG. 1, the lighting system of one embodiment in accordance with the present invention includes a lighting fixture 2 including a first controller 22 and a sensing device 1, the first controller 22 being configured to control a light source 21.

The sensing device 1 includes an image sensor 11 configured to take an image of a predetermined area (detection area) and a second controller 12 having a function of adjusting sensitivity of the image sensor 11 and a function of setting a dimming rate for the light source 21.

The second controller 12 is configured to judge whether or not a person is present in the predetermined area, based on the image of the predetermined area taken by the image sensor 11. The second controller 12 is configured to, when concluding that a condition where no person is present in the predetermined area continues for (throughout) a predetermined time period, perform an operation (first operation) of decreasing the dimming rate by a preset value and increasing the sensitivity of the image sensor 11 for a preset time period.

The following is a detailed explanation made to the lighting system of the present embodiment. FIG. 1 is a schematic diagram illustrating an example of the lighting system of the present embodiment. This lighting system includes the sensing device 1 and the plural lighting fixtures 2. The sensing device 1 and each of the lighting fixtures 2 are connected through a transmission line L1. In other words, in the present embodiment, the sensing device 1 and the lighting fixture 2 are configured to establish wired communication with each other. Alternatively, the sensing device 1 and the lighting fixture 2 may be configured to establish wireless communication with each other.

As shown in FIG. 1, the sensing device 1 includes the image sensor 11 and the second controller 12. The image sensor 11 is designed to take an image of the predetermined area. The second controller 12 is configured to detect presence of a person in the image taken by the image sensor 11, and sets the dimming rate for the light source 21 based on a detection result.

The image sensor 11 is constituted integrally by a solid-state image sensing device (e.g., a CCD image sensor and a CMOS image sensor), an optical lens, and a signal processing circuit. The image sensor 11 is placed on a site (e.g., a ceiling) such that the predetermined area (e.g., an area in a room) is included in an imaging area of the image sensor 11. The image sensor 11 provides created image data (image) to the second controller 12. The second controller 12 determines based on the image data inputted from the image sensor 11 whether or not a person is present, and sets the dimming rate for the light source 21 according to a detection result. In other words, the second controller 12 selects the dimming rate from a predetermined range in accordance with the detection result. The second controller 12 sends the set dimming rate to the first controller 22 through the transmission line L1.

Note that, in the present embodiment, the second controller 12 creates the aforementioned background difference image or interframe difference image based on the image data sent from the image sensor 11, and detects presence of a person based on these images. This operation is same as the prior art and an explanation thereof is deemed unnecessary.

In other words, the second controller 12 is configured to judge whether a person is present in the predetermined area, based on whether a difference between a brightness value of the image of the predetermined area taken by the image sensor 11 and a brightness value of a reference image is not less than a predetermined threshold. Note that, the reference image is defined as a background image of the predetermined area or a previous image of the predetermined area.

In the present embodiment, the sensitivity of the image sensor 11 is determined by the predetermined threshold. The sensitivity of the image sensor 11 is decreased with an increase in the predetermined threshold, and the sensitivity of the image sensor 11 is increased with a decrease in the predetermined threshold. Hence, the second controller 12 decreases the predetermined threshold to increase the sensitivity of the image sensor 11. The second controller 12 increases the predetermined threshold to decrease the sensitivity of the image sensor 11.

As shown in FIG. 1, the lighting fixture 2 includes the light source 21 (e.g., an LED) and the first controller 22 configured to control a light output (lighting level) of the light source 21.

The first controller 22 receives the dimming rate for the light source 21 from the second controller 12 via the transmission line L1, and creates a control signal according to the received dimming rate, and provides the created control signal to the light source 21 to light the light source 21 at a corresponding lighting level. In brief, the first controller 22 is configured to light the light source 21 at the lighting level corresponding to the dimming rate received from the second controller 12. In other words, the first controller 22 is configured to adjust the light output of the light source 21 to the light output corresponding to the dimming rate received from the second controller 12.

Figure 2:
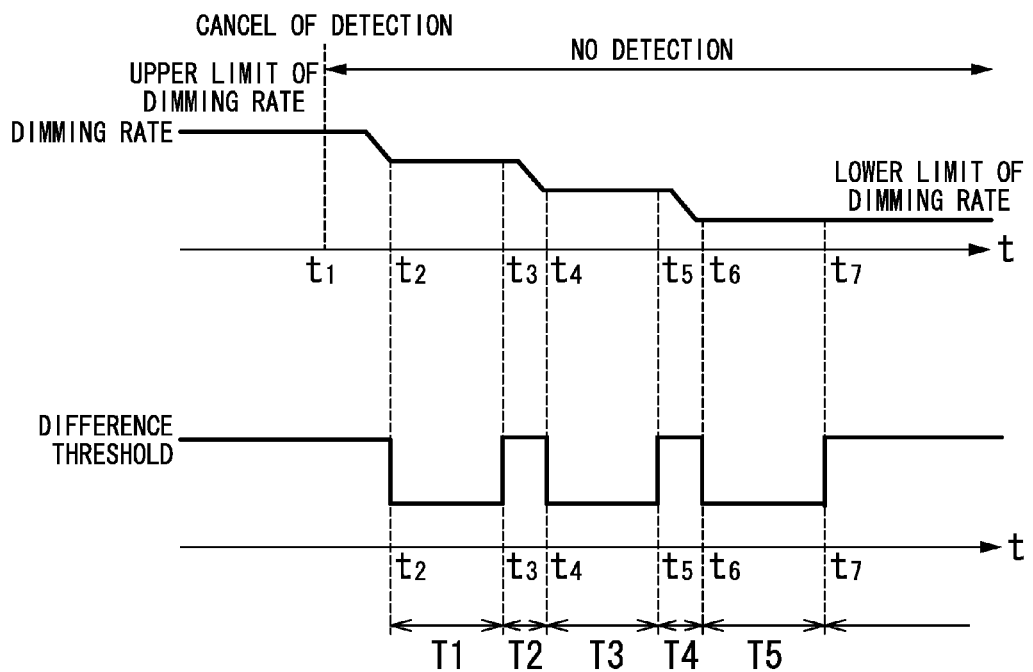
FIG. 2 is a time chart illustrating an operation of the lighting system of the above embodiment.

The following explanation referring to FIG. 2 is made to an operation of the lighting system of the present embodiment in a situation where a person is detected by the image sensor 11 and thereafter is not detected.

In an initial state, while a person is detected based on the image sensor 11, the dimming rate for the light source 21 is adjusted to a predetermined value (e.g., an upper limit) (see FIG. 2). Thus, the light source 21 is lit at the lighting level (e.g., a full power level) corresponding to this dimming rate.

In the present embodiment, for example, to detect a difference between the brightness values of the background image preliminarily taken by the image sensor 11 and the current image or a difference between the brightness values of the current image and the previous image one frame ago, the predetermined threshold is provided. Only the difference not less than this threshold is detected. In this regard, to increase the sensitivity of the image sensor 11, this threshold is decreased.

When a person who has detected in the imaging area of the image sensor 11 is not detected throughout a predetermined time period, the second controller 12 cancels a detection state at the time t1, and decreases the dimming rate for the light source 21 by a preset value. In other words, the second controller 12 performs the first operation.

When a light intensity of the light source 21 is decreased down to a predetermined value at the time t2 while the sensitivity of the image sensor 11 is maintained, a detection performance is decreased due to a decrease in the light intensity of the light source 21 while the sensitivity of the image sensor 11 is maintained. However, in the present embodiment, the threshold (difference threshold) is increased in order to increase the sensitivity of the image sensor 11.

Subsequently, the second controller 12 maintains a state where the sensitivity of the image sensor 11 is increased, for a preset time period (time period T1 in FIG. 2), until the time t3. Since a person is not detected during this time period, the second controller 12 returns the threshold to a default (previous) value at the time t3. As a result, the sensitivity of the image sensor 11 is returned to a previous level (normal sensitivity). In brief, in the first operation, the second controller 12 keeps adjusting the sensitivity of the image sensor 11 to sensitivity higher than the normal sensitivity.

Thereafter, the second controller 12 further decreases the dimming rate for the light source 21 by the preset value. The second controller 12 further decreases the threshold to increase the sensitivity of the image sensor 11 at the time t4 when the light intensity of the light source 21 is further decreased. After that, the second controller 12 maintains the state where the sensitivity of the image sensor 11 is increased, for the preset time period (time period T3 in FIG. 2), until the time t5. Since a person is not detected during this time period, the second controller 12 returns the threshold to the default value at the time t5. As a result, the sensitivity of the image sensor 11 is returned to the previous level (normal sensitivity).

Moreover, the second controller 12 decreases the dimming rate for the light source 21 by the preset value. The second controller 12 further decreases the threshold to increase the sensitivity of the image sensor 11 at the time t6 when the light intensity of the light source 21 is further decreased. Subsequently, the second controller 12 maintains the state where the sensitivity of the image sensor 11 is increased, for the preset time period (time period T5 in FIG. 2), until the time t7. Since a person is not detected during this time period, the second controller 12 returns the threshold to the default value at the time t7. As a result, the sensitivity of the image sensor 11 is returned to the previous level (normal sensitivity).

At this time, since the dimming rate for the light source 21 reaches a lower limit (lower limit of the aforementioned predetermined range) and a person is not detected, the second controller 12 concludes that a person has already left and maintains a state where the light source 21 is lit at the lower limit of the dimming rate. As mentioned above, the second controller 12 repeats the operation (first operation) until the dimming rate reaches the lower limit. Note that, each of the time periods T2 and T4 in FIG. 2 represents a time period in which the sensitivity of the image sensor 11 is returned to the normal sensitivity.

In the example illustrated in FIG. 2, the sensitivity of the image sensor 11 is maintained while the light output of the light source 21 is varied (dimmed) by the first controller 22. Hence, it is possible to avoid false detection which would otherwise occur due to noises caused by a variation in the light output of the light source 21. In brief, the second controller 12 is configured to, when acknowledging that the first controller 22 lights the light source 21 at the dimming level according to the dimming rate set by the second controller 12 after the dimming rate is decreased by the preset value, increase the sensitivity of the image sensor 11.

Figure 3:
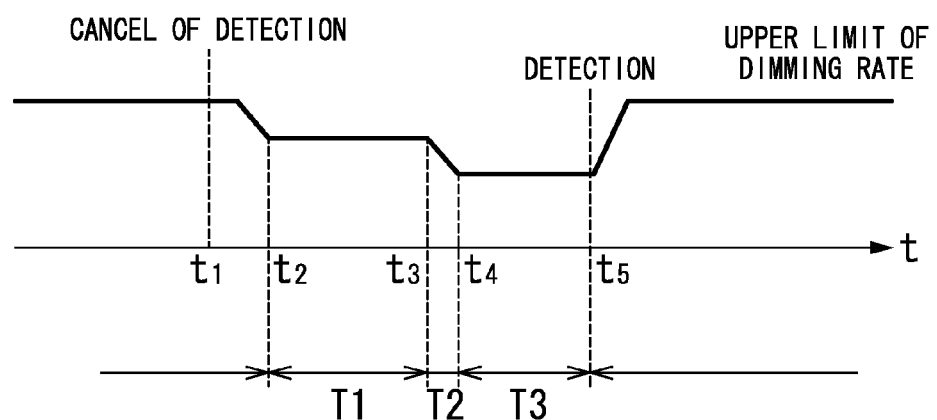
FIG. 3 is a time chart illustrating another operation of the lighting system of the above embodiment.

The following explanation referring to FIG. 3 is made to an operation of the lighting system of the present embodiment in a situation where a person is detected by the image sensor 11 and thereafter is not detected but subsequently is detected again.

When a person who has detected in the imaging area of the image sensor 11 is not detected throughout the predetermined time period, the second controller 12 cancels the detection state at the time t1, and decreases the dimming rate for the light source 21 by the preset value. When the light intensity of the light source 21 is decreased down to the predetermined value at the time t2, the second controller 12 decreases the threshold to increase the sensitivity of the image sensor 11.

Subsequently, the second controller 12 maintains the state where the sensitivity of the image sensor 11 is increased, for the preset time period (time period T1 in FIG. 3), until the time t3. Since a person is not detected during this time period, the second controller 12 returns the threshold to the normal sensitivity at the time t3.

Thereafter, the second controller 12 further decreases the dimming rate for the light source 21 by the preset value, and increases the sensitivity of the image sensor 11 again at the time t4 when the light intensity of the light source 21 is further decreased.

After that, when a person is detected at the time t5 while the sensitivity of the image sensor 11 is increased, the second controller 12 increases the dimming rate for the light source 21 up to the upper limit (upper limit of the aforementioned predetermined range), and lights the light source 21 at the lighting level according to the dimming rate. In brief, the second controller 12 is configured to, when concluding that a person is present in the predetermined area, set the dimming rate to the predetermined value (upper limit). Simultaneously, the second controller 12 returns the sensitivity of the image sensor 11 to an initial level.

Accordingly, visibility can be improved and this causes improvement of comfort. Further, an amount of light reflected by a person is increased. Thus, the detection performance by use of the image sensor 11 can be improved.

Figure 4:
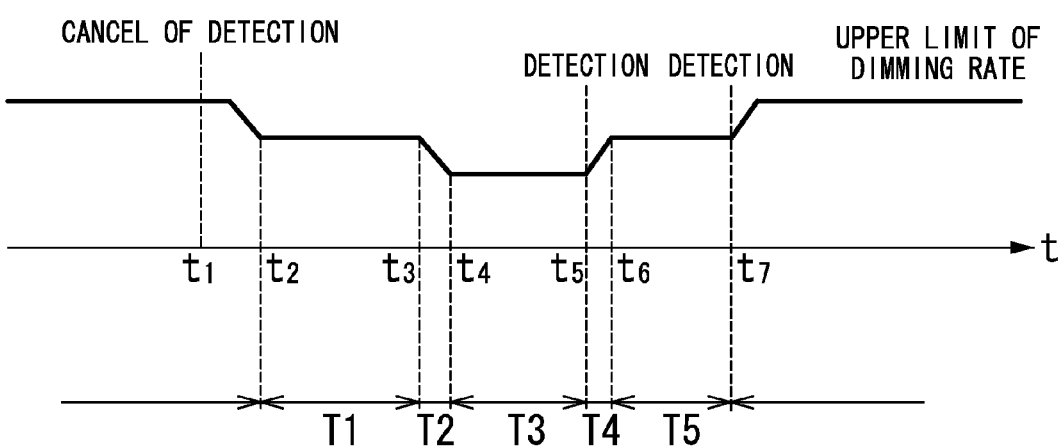
FIG. 4 is a time chart illustrating another operation of the lighting system of the above embodiment.

Note that, as shown in FIG. 4, until the dimming rate for the light source 21 reaches the upper limit, the dimming rate may be increased in a stepwise manner each time a person is detected. With this modification, similarly, visibility can be improved and this causes improvement of comfort. Further, an amount of light reflected by a person is increased. Thus, the detection performance by use of the image sensor 11 can be improved. In brief, the second controller 12 is configured to, each time concluding that a person is present in the predetermined area, perform an operation (second operation) of increasing the dimming rate by a preset value and increasing the sensitivity of the image sensor 11 for a preset time period. In the second operation, the second controller 12 keeps adjusting the sensitivity of the image sensor 11 to sensitivity higher than the normal sensitivity only for the preset time period. When concluding that the dimming rate is equal to the upper limit, the second controller 12 returns the sensitivity of the image sensor to the initial level.

Figure 5:
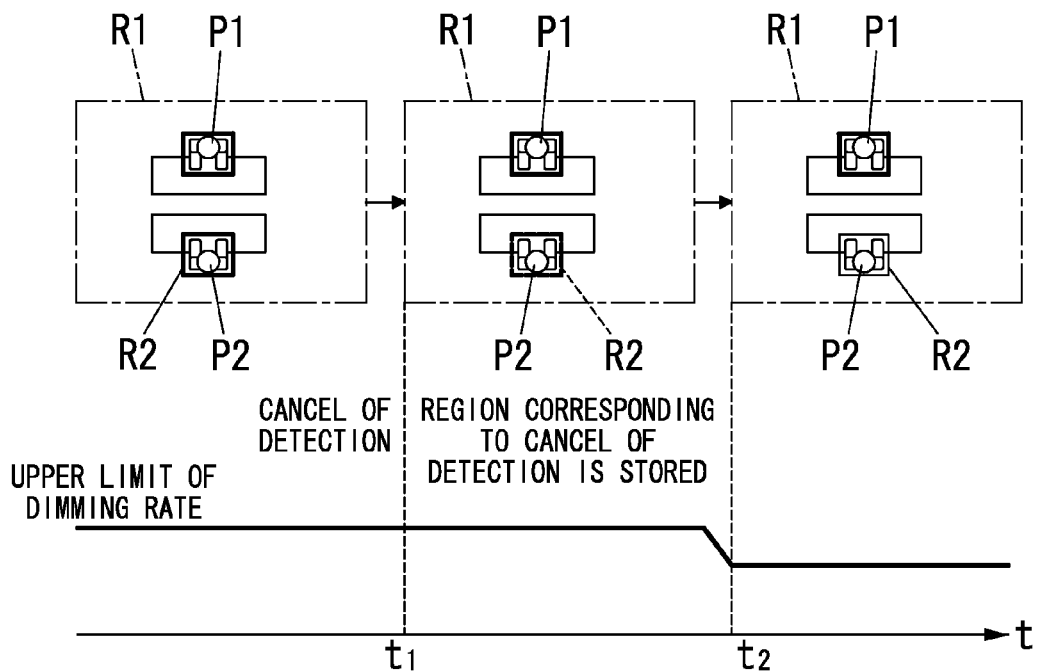
FIG. 5 is an explanation diagram illustrating another operation of the lighting system of the above embodiment.
Figure 6:
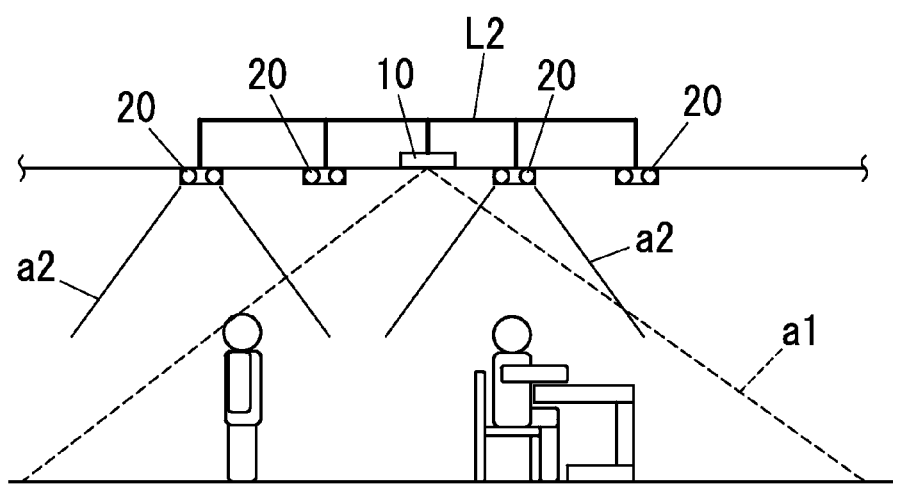
FIG. 6 is a schematic diagram illustrating an example of the prior lighting system.

In each of the aforementioned cases, the sensitivity is varied with regard to the entire area imaged by the image sensor 11. Alternatively, the sensitivity may be varied with regard to part of the area. This example is described below with reference to FIG. 5.

When a person P2 who has been detected in the imaging area R1 of the image sensor 11 is not detected throughout the predetermined time period, the second controller 12 cancels the detection state at the time t1, and further stores, in a memory (not shown), a region R2 (area) in which the person P2 has been detected. Thereafter, the second controller 12 decreases the dimming rate for the light source 21 by the preset value, and increases the sensitivity of the image sensor 11 with regard to the region R2 at the time t2 when the light intensity of the light source 21 is decreased down to the predetermined value.

In other words, the second controller 12 has a function of adjusting the sensitivity of the image sensor 11 for each region included in the predetermined area. Thus, the second controller 12 increases the sensitivity of the image sensor 11 for the preset time period with regard to the region R2 in the predetermined area in which the second controller 12 has concluded that the condition where no person is present continues for the predetermined time period.

Accordingly, it is possible to minimize a region susceptible to noises.

Therefore, according to the present embodiment, when the present embodiment fails in detection of a person, the present embodiment decreases the dimming rate for the light source 21 by the preset value. Therefore, a person (worker) can be notified of the fact that the person is not detected by the image sensor 11. In this regard, since the sensitivity of the image sensor 11 is increased for the preset time period, it is possible to detect a slight movement of a person. Hence, the detection accuracy of the image sensor 11 can be improved. Further, in the present embodiment, the dimming rate is decreased down to the lower limit in a stepwise manner. Accordingly, in contrast to an instance where the dimming rate is decreased down to the lower limit at one time, the sensitivity of the image sensor 11 can be improved yet the visibility is maintained.

As mentioned above, the lighting system of the present invention includes the following first feature. In the first feature, the lighting system includes the lighting fixture 2 and the sensing device 1. The lighting fixture 2 includes the light source 21 and the first controller 22 configured to control the light output of the light source 21. The sensing device 1 includes the image sensor 11 and the second controller 12. The image sensor 11 is configured to take the image of the predetermined area. The second controller 12 is configured to detect presence of a person in the image taken by the image sensor 11 and set the dimming rate for the light source 21 according to the detection result. The second controller 12 is configured to decrease the dimming rate for the light source 21 by the constant value and increase the sensitivity of the image sensor 11 for the constant duration when the state where no person is detected in the image taken by the image sensor 11 continues throughout the predetermined time period.

In other words, the lighting system includes the lighting fixture 2 including the first controller 22 configured to control the light source 21; and the sensing device 1. The sensing device 1 includes: the image sensor 11 configured to take the image of the predetermined area; and the second controller 12 having the function of adjusting the sensitivity of the image sensor 11 and the function of setting the dimming rate for the light source 21. The first controller 22 is configured to light the light source 21 at the dimming level according to the dimming rate set by the second controller 12. The second controller 12 is configured to judge whether or not a person is present in the predetermined area, based on the image of the predetermined area taken by the image sensor 11. The second controller 12 is configured to, when concluding that the condition where no person is present in the predetermined area continues for the predetermined time period, perform the operation (first operation) of decreasing the dimming rate by the preset value and increasing the sensitivity of the image sensor 11 for the preset time period.

Additionally, the lighting system of the present embodiment may include the following second to ninth features selectively in addition to the first feature.

As for the second feature, in the first feature, the second controller 12 is configured to keep the sensitivity of the image sensor 11 constant while the first controller 22 varies the light output of the light source 21. In other words, the second controller 12 is configured to, when acknowledging that the first controller 22 lights the light source 21 at the dimming level according to the dimming rate set by the second controller 12 after the dimming rate is decreased by the preset value, increase the sensitivity of the image sensor 11.

As for the third feature, in the first or second feature, the second controller 12 is configured to repeat an operation of decreasing the dimming rate for the light source 21 by a constant value and increasing the sensitivity of the image sensor 11 for a constant time period until the dimming rate for the light source 21 reaches the lower limit. In other words, the second controller 12 is configured to repeat the operation (first operation) until the dimming rate is equal to the lower limit.

As for the fourth feature, in any one of the first to three features, the second controller 12 is configured to increase the sensitivity with regard to only an area where a person has been detected in the image taken by the image sensor 11 and then has not been detected. In other words, the second controller 12 is configured to, in the operation (first operation), increase the sensitivity of the image sensor 11 for the preset time period with regard to a region in the predetermined area in which the second controller 12 has concluded that the condition where no person is present continues for the predetermined time period.

As for the fifth feature, in any one of the first to fourth features, the second controller 12 is configured to, when concluding that a person is present in the predetermined area, set the dimming rate to the upper limit.

As for the sixth feature, in the fifth feature, the second controller 12 is configured to, when concluding that a person is present in the predetermined area, return the sensitivity of the image sensor 11 to the initial level.

As for the seventh feature, in any one of the first to sixth features, the second controller 12 is configured to, each time concluding that a person is present in the predetermined area, increase the dimming rate by a preset value and increase the sensitivity of the image sensor 11 for a preset time period.

As for the eighth feature, in the seventh feature, the second controller 12 is configured to, when concluding that the dimming rate is equal to the upper limit, return the sensitivity of the image sensor 11 to the initial level.

As for the ninth feature, in any one of the first to eighth features, the second controller 12 is configured to judge whether a person is present in the predetermined area, based on whether the difference between the brightness value of the image of the predetermined area taken by the image sensor 11 and the brightness value of the reference image is not less than the predetermined threshold. The sensitivity of the image sensor 11 is determined by the predetermined threshold.

Accordingly, even when the dimming rate for the light source 21 is decreased due to failure of detection of a person, since the sensitivity of the image sensor 11 is increased for the preset time period, the present embodiment can detect a slight movement of a person. As a result, it is possible to provide the lighting system with the improved detection accuracy based on the image sensor 11.

The invention claimed is:

1. A lighting system comprising:
   a lighting fixture including a first controller configured to control a light source; and
   a sensing device,
   wherein
   the sensing device includes:
      an image sensor configured to take an image of a predetermined area; and
      a second controller having a function of adjusting sensitivity of the image sensor and a function of setting a dimming rate for the light source,
   the first controller is configured to light the light source at a dimming level according to the dimming rate set by the second controller,
   the second controller is configured to judge whether or not a person is present in the predetermined area, based on the image of the predetermined area taken by the image sensor,
   the second controller is configured to, when concluding that a condition where no person is present in the predetermined area continues for a predetermined time period, perform an operation of decreasing the dimming rate by a preset value and increasing the sensitivity of the image sensor for a preset time period,
   the second controller is configured to judge whether a person is present in the predetermined area, based on whether a difference between a brightness value of the image of the predetermined area taken by the image sensor and a brightness value of a reference image is not less than a predetermined threshold, and
   the sensitivity of the image sensor is determined by the predetermined threshold.

2. The lighting system as set forth in claim 1, wherein the second controller is configured to, when acknowledging that the first controller lights the light source at the dimming level according to the dimming rate set by the second controller after the dimming rate is decreased by the preset value, increase the sensitivity of the image sensor.

3. The lighting system as set forth in claim 1, wherein the second controller is configured to repeat the operation until the dimming rate is equal to a lower limit.

4. The lighting system as set forth in claim 1, wherein the second controller is configured to, in the operation, increase the sensitivity of the image sensor for the preset time period with regard to a region in the predetermined area in which the second controller has concluded that the condition where no person is present continues for the predetermined time period.

5. The lighting system as set forth in claim 1, wherein the second controller is configured to, when concluding that a person is present in the predetermined area, set the dimming rate to an upper limit.

6. The lighting system as set forth in claim 5, wherein the second controller is configured to, when concluding that a person is present in the predetermined area, return the sensitivity of the image sensor to an initial level.

7. The lighting system as set forth in claim 1, wherein the second controller is configured to, each time concluding that a person is present in the predetermined area, increase the dimming rate by a preset value and increase the sensitivity of the image sensor for a preset time period.

8. The lighting system as set forth in claim 7, wherein the second controller is configured to, when concluding that the dimming rate is equal to an upper limit, return the sensitivity of the image sensor to an initial level.

* * * * *